United States Patent

[11] 3,630,215

| [72] | Inventor | Masanori Okimoto |
| | | Hiroshima-shi, Japan |
| [21] | Appl. No. | 870,029 |
| [22] | Filed | Oct. 28, 1969 |
| [45] | Patented | Dec. 28, 1971 |
| [73] | Assignee | Toyo Kogyo Co., Ltd. |
| | | Hiroshima, Japan |
| [32] | Priority | Oct. 30, 1968 |
| [33] | | Japan |
| [31] | | 43/95129 |

[54] HYDRAULIC GOVERNOR
4 Claims, 3 Drawing Figs.

[52] U.S. Cl. ................................................ 137/54, 137/56
[51] Int. Cl. ........................................ G05d 13/30
[50] Field of Search ........................... 137/53, 54, 56

[56] References Cited
UNITED STATES PATENTS
| 3,279,486 | 10/1966 | Duffy et al. ................. | 137/54 |
| 3,322,133 | 5/1967 | Searles ...................... | 137/56 |

Primary Examiner—Robert G. Nilson
Attorney—Sughrue, Rothwell, Mion, Zinn & Macpeak ABSTRACT: A hydraulic governor having a plurality of valve elements wherein one valve element produces a governor pressure inversely proportional to the centrifugal force operating this valve element, which governor pressure acts on a pressure receiving surface of another valve and the governor pressure generated by the latter valve element is balanced with the centrifugal force operating the latter valve element. This governor eliminates the unstability of control of the line pressure in response to the change of the governor pressure produced by the governor.

INVENTOR
MASANORI OKIMOTO

3,630,215

HYDRAULIC GOVERNOR

BACKGROUND OF THE INVENTION

1. Field of the Invention

This invention relates generally to a hydraulic governor for converting centrifugal forces which act on the governor weights and valve elements into an oil pressure or a governor pressure in rotation with a rotary shaft, and more particularly to an improvement in a hydraulic governor adapted to control the hydraulic pressure of an automatic transmission of an automobile.

2. Description of the Prior Art

Automatic transmissions for automobiles generally comprise shift valves for shifting a plurality of power trains, wherein said shift valves are operated by a governor pressure proportional to the rotational speed of a driven shaft, or the vehicle's speed and also a throttle pressure proportional to the torque generated in the engine in order to be on or off in accordance with the variations of the vehicle speed and the torque generated in the engine, whereby a shifting of the power trains is carried out in response to the variations of these pressures. For this reason, the governor pressure regulated by the hydraulic governor is preferable to change sensitively in all ranges of rotation of the driven shaft, in which the shifting operation of the power trains is carried out.

However, this type of hydraulic governor for automatic transmissions transfers the centrifugal force raised by the rotation of the driven shaft into a hydraulic pressure or governor pressure, and moreover transfers the line pressure into a governor pressure proportional to the centrifugal force. The governor pressure characteristics are such that the varying amplitude of the governor pressure in the low-speed range is smaller than that in the high-speed range and its maximum value is limited by the amplitude of the line pressure. Accordingly, if the varying rate of the governor pressure in all ranges is made larger in order that the varying amplitude of the governor pressure in the low-speed range be relatively larger, the governor pressure becomes the line pressure which is the maximum value of the governor pressure before it reaches a maximum shiftable rotating speed with the result that the transmission cannot be shifted by the shift valve by means of the governor pressure in the neighborhood of high-vehicle speeds. On the other hand, if the varying rate of the governor pressure is made small so that the governor pressure be able to vary within the range of maximum shiftable rotating speed, the varying amplitude of the governor pressure in the low-speed ranges becomes quite small with the result that the shift valve is difficult to be controlled accurately (in the predetermined speed) by the governor pressure in the low-speed range.

Heretofore, in hydraulic governors in which the varying rate of the governor is set small and the hydraulic governor in which the varying rate of the governor is set large, the governor pressure generated by the latter governor having a larger varying rate acts on the other hydraulic governor in the same direction as the operating direction of the centrifugal force of the valve element thereof so as to eliminate the aforementioned disadvantages of the governor as a proposed hydraulic governor. That is, in this conventional type, because the governor pressure generated by the governor having the larger varying rate acts on the other valve element even after the governor pressure reaches the line pressure, which is the maximum value thereof, this line pressure must be always held constant. However, since the line pressure must vary in response to the torque generated in the engine, vehicle speed and changes in gear ratios, respectively, if the line pressure is made constant so as to regulate accurately the governor pressure of the hydraulic governor of this type, the loss of the oil pump may occur and if the line pressure is controlled by the aforementioned respective element, the governor pressure is varied by the line pressure regardless of the rotating speed of the rotary shaft to thereby introduce serious disadvantages.

SUMMARY OF THE INVENTION

This invention contemplates eliminating the aforementioned disadvantages of conventional hydraulic governors and provides a new and improved hydraulic governor which comprises a plurality of valve elements wherein one valve element produces a governor pressure inversely proportional to the centrifugal force operating this valve element, which governor pressure acts on a pressure receiving surface of the other valve element and the governor pressure generated by the latter valve element increases with the centrifugal force operating the latter valve element.

DESCRIPTION OF THE DRAWINGS

The other features and advantages of the present invention will become apparent from the following description taken in conjunction with the accompanying drawings, in which.

DETAILED DESCRIPTION OF THE PREFERRED EMBODIMENT

Figure 1:
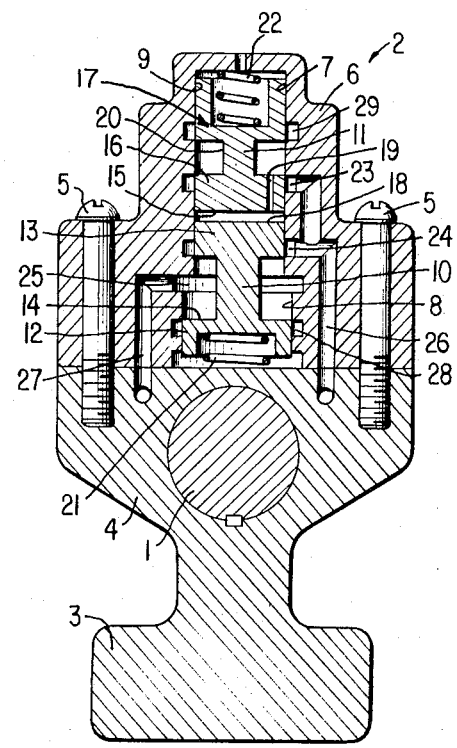
FIG. 1 is a sectional view of one embodiment of the hydraulic governor constructed in accordance with the present invention.

Reference is now made to FIG. 1., which shows one embodiment of the hydraulic governor constructed according to the present invention.

The hydraulic governor comprises a rotary shaft 1, a valve body 2 fixed to the rotary shaft 1 having a supporting member or flange 4 integrally formed with a balance weight 3 thereon and a supported member or integral part 6 fixed to the flange 4 by bolts 5, a cylinder 7 provided in the integral part 6 and having a large diameter portion 8 and a small diameter portion 9, a first valve element 10 and second valve element 11 slidably inserted in the cylinder 7. The first valve element 10 has lands 12 and 13 corresponding to the large diameter portion 8 and small diameter portion 9 of the cylinder 7. The land 12 has a pressure receiving surface 14, and the second valve element 11 has a land 16 having a pressure receiving surface 15 and a land 17. The pressure receiving surface 15 communicates with an annular groove 20 disposed between the land 16 and 17 through an oil passage 19 opposite to a pressure receiving surface 18 of the first valve element 10. Springs 21 and 22 are provided for urging the first valve element 10 and second valve element 11, the spring 21 urges the first valve element outwardly and the spring 22 urges the second valve element 11 inwardly. Oil passage ports 23 and 24 communicate with each other through an oil passage 26, and an oil passage port 25 communicates with an oil passage 27 and exhaust ports 28 and 29.

Figure 3:
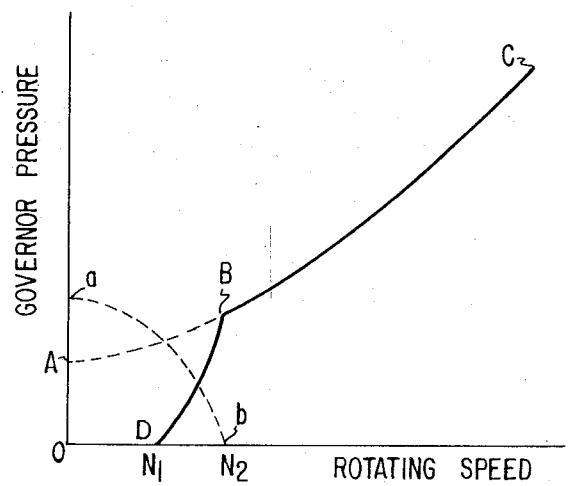
FIG. 3 is a graphical representation of the governor pressure characteristics of the hydraulic governor shown in FIG. 1 and 2.

In the operation of the hydraulic governor thus disclosed with reference to FIG. 3, concerning the first governor pressure characteristics of the first valve element 10, if the line pressure supplied from the oil pump is supplied to the oil passage port 24 when the rotary shaft 1 is stationary, the first governor pressure is held at the point A by the balance between the force pushing the first valve element 10 inwardly by operation of the portion of the line pressure supplied from the oil passage port 24 on the pressure receiving surface 14 and the force pushing the first valve element 10 outward by the spring 21. In such a state, if the rotary shaft 1 starts to rotate so that the centrifugal force operates on the first valve element 10, the first governor pressure is held on the line A–B–C in proportion to the centrifugal force by the balance between the force pushing the first valve element 10 inwardly by the operation of a portion of the line pressure receiving surface 14 and the force pushing the first valve element 10 outward by the spring 21 and the centrifugal force so that the portion of the line pressure supplied from the oil passage port 24 is converted into the first governor pressure.

With respect to the second governor pressure characteristics of the second valve element 11, which is similar to the aforementioned case, if the line pressure is supplied to the oil passage port 23 when the rotary shaft 1 is stationary, a part of the line pressure supplied from the oil passage port 23 is maintained as a second governor pressure at the point (a) by the balance between the force pushing the second valve element 11 outwardly and the force pushing the second valve element 11 inwardly by the spring 22, which acts on the pressure receiving surface 15 through the oil passage 19. From such a state, the rotary shaft 1 begins to rotate so that the centrifugal force operates on the second valve element 11, the second governor pressure is held along the line a–b in inverse proportion to the increase of the centrifugal force operating on the second valve element 11 by the balance between the force pushing the second valve element 11 outwardly by a part of the line pressure operating on the pressure receiving surface 15 and the centrifugal force and the force pushing the second valve element 11 inwardly by the spring 22, and becomes zero at the point (b).

The governor pressure characteristics of the state wherein the second governor pressure regulated by the aforementioned second valve element 11 acts on the pressure receiving surface 18 of the first valve element 10, will now be described as follows. When the rotating speed of the rotary shaft 1 is within the range from zero to $N_1$, and the second governor pressure is generated by the second valve element 11 and operates on the pressure receiving surface 18, the first valve element 10 is slid inwardly against the centrifugal force operating on the first valve element 10 and the tension of the spring 21 so that the oil passage port 24 is closed by the land 13, and accordingly the governor pressure is not generated in the oil passage port 25. From such a state, if the rotating speed of the rotary shaft 1 goes beyond the balance point between the composite force of the centrifugal force operating the first valve element 10 and the tension of the spring 21 and force pushing the first valve element 10 inwardly by the governor pressure generated by the second valve element 11 operating on the pressure receiving surface 18, part of the line pressure is supplied from the oil passage port 24 into the cylinder 7. Thus, the governor pressure supplied through oil passage port 25 to the oil passage 27 is held along the line D–B by the balance between the force pushing the first valve element 10 inwardly by the second governor pressure generated by the second valve element 11 and operating on the pressure receiving surface 18 and the first governor pressure operating on the pressure receiving surface 14, and the pressing force for pushing the first valve element 10 outwardly by the spring 21 and centrifugal force.

Further, for rotating speeds over $N_2$, as the second governor pressure generated by the second valve element 11 decreases to zero, as aforesaid, the governor pressure supplied to the oil passage 27 through the oil passage port 25 is held on the line B–C in proportion to the centrifugal force operating on the first valve element 10.

Accordingly, the hydraulic governor of this invention may optionally select the mass of the first and second valve elements 10 and 11 and the spring constant of the springs 21 and 22 whereby the rising point of the governor pressure supplied to the oil passage 27, the varying amplitude in low speed rotating range, and high speed rotating range may be at an optimum state.

It is understood from the foregoing description that the present invention provides that the governor pressure regulated by the second valve element is made inversely proportional to the centrifugal force with the result that over the predetermined speed it becomes zero and accordingly the aforementioned disadvantages of the conventional hydraulic governor may be eliminated so as to control the governor pressure accurately.

Figure 2:
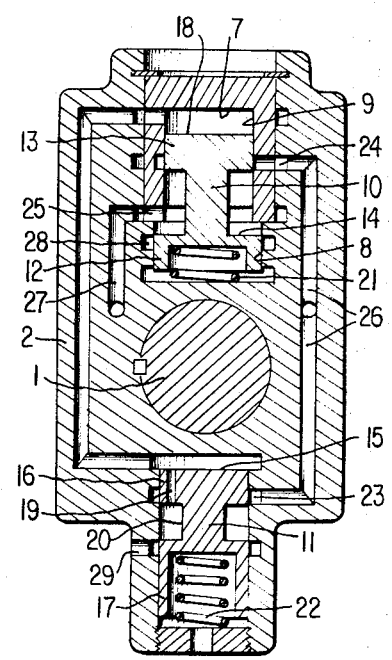
FIG. 2 is a view similar to FIG. 1, but showing another embodiment thereof.

It should also be understood that even if the first valve element 10 and the second valve element 11 are disposed opposite each other between the rotary shaft 1 as shown in the second embodiment of this invention (FIG. 2) the same effect may be obtained.

What is claimed is:

1. A hydraulic governor comprising in combination:
   a  a valve body fixed to a rotary shaft and rotatable therewith,
   b  primary valve means including a primary cylinder formed radially in said valve body, a primary valve element having first and second pressure receiving surfaces and being slidably disposed within said primary cylinder,
   c  secondary valve means including a secondary cylinder formed radially in said valve body, a secondary valve element having a third pressure receiving surface and being slidably disposed within said secondary cylinder, and a spring operatively connected to said secondary valve element for urging said secondary valve element radially inwardly,
   d  said secondary valve means being connected to a fluid source for producing a secondary governor pressure by the balance between the inward force of said spring thereon, the centrifugal force acting on said secondary valve element and the force of the fluid pressure applied on said third pressure receiving surface acting to force said secondary valve element outwardly,
   e  said secondary governor pressure decreasing gradually with an increase of the speed of said rotary shaft,
   f  said secondary governor pressure communicating with said first pressure receiving surface,
   g  said primary valve means connected to said fluid source for producing a primary resultant governor pressure by the balance between the centrifugal force acting on said primary valve element and the fluid pressure forces applied on said first and second pressure receiving surfaces of said primary valve element pressing said primary valve element inwardly,
   h  whereby said primary resultant governor pressure increases at a first rapidly increasing rate with the increase of the speed of said rotary shaft below a predetermined speed of said shaft and increases at a second slower increasing rate with the increase of the speed of said rotary shaft over the predetermined speed of said shaft.

2. A hydraulic governor as claimed in claim 1, wherein said primary valve means further comprises spring means urging said primary valve element outwardly with a predetermined biasing force, the force of said spring of said second valve means being sufficient to oppose the centrifugal force and the fluid pressure force acting on said secondary valve element to cause said secondary governor pressure acting on said primary governor valve element to decrease to zero at said predetermined speed of said rotary shaft, whereby said primary resulting governor pressure is maintained at zero within a second predetermined speed of said shaft smaller than said first predetermined speed, and increases at a first rapidly increasing rate when the speed of said shaft is in the range between the second and said first predetermined values and increases at a second slower increasing rate over said first predetermined speed of said shaft.

3. A hydraulic governor as claimed in claim 1, wherein said primary and secondary valve means are radially disposed on the opposite sides of said rotary shaft, ad said secondary governor pressure produced by said secondary valve means is communicated to said first pressure receiving surface of said primary valve means through a fluid passage provided in said valve body.

4. A hydraulic governor as claimed in claim 1, wherein said primary and secondary cylinder are formed integrally and in axial alignment at the same side of said rotary shaft, said secondary valve element being disposed radially outwardly of said primary valve element and said first and third pressure receiving surfaces are adjacent each other.